US011375762B2

(12) United States Patent
Cutkosky et al.

(10) Patent No.: US 11,375,762 B2
(45) Date of Patent: Jul. 5, 2022

(54) GLOVE WITH DRY-ADHESIVE AND DRY-NON-ADHESIVE MICRO-WEDGES

(71) Applicant: The Board of Trustees of the Leland Stanford Junior University, Stanford, CA (US)

(72) Inventors: Mark R. Cutkosky, Palo Alto, CA (US); Kyung Won Han, Stanford, CA (US); Srinivasan Arul Suresh, Stanford, CA (US); Elliot W. Hawkes, Santa Barbara, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 825 days.

(21) Appl. No.: 16/228,950

(22) Filed: Dec. 21, 2018

(65) Prior Publication Data
US 2019/0110536 A1    Apr. 18, 2019

Related U.S. Application Data

(63) Continuation-in-part of application No. 15/966,264, filed on Apr. 30, 2018, now abandoned.

(60) Provisional application No. 62/492,248, filed on Apr. 30, 2017.

(51) Int. Cl.
*A41D 19/015*    (2006.01)
*B32B 3/00*    (2006.01)
(Continued)

(52) U.S. Cl.
CPC .......... *A41D 19/01564* (2013.01); *B32B 3/00* (2013.01); *C09J 7/00* (2013.01);
(Continued)

(58) Field of Classification Search
CPC ........ A41D 19/01564; B32B 3/00; C09J 7/00; C09J 7/20; C09J 2203/358; C09J 2301/20;
(Continued)

(56) References Cited

U.S. PATENT DOCUMENTS

| | | | |
|---|---|---|---|
| 2006/0041991 A1* | 3/2006 | Kim Sim ........... | A41D 19/0062 2/168 |
| 2007/0061942 A1* | 3/2007 | Schrodl ................... | A61B 42/50 2/159 |
| 2007/0283516 A1* | 12/2007 | Rasmussen .......... | A01K 13/002 15/160 |

OTHER PUBLICATIONS

Suresh et al. Surface and Shape Deposition Manufacturing for the Fabrication of a Curved Surface Gripper. Journal of Mechanisms and Robotics, May 2015 V(7) 7 pages, JMR-14-1212; doi: 10.1115/1.4029492.
(Continued)

*Primary Examiner* — Patricia L. Nordmeyer
(74) *Attorney, Agent, or Firm* — Lumen Patent Firm

(57) ABSTRACT

A glove with gecko-inspired dry adhesives is provided to greatly reduce the required grasp force on heavy, smooth items. The orientation of the gecko adhesives is designed to increase shear forces between the glove and the object when lifting and manipulating. The invention additionally equips the non-gripping surfaces of the glove (e.g. back and sides) with a non-adhesive microstructure that prevents the glove from accidently adhering to surfaces during unintentional contact, even when touching otherwise sticky materials such as adhesive-coated automotive panels.

5 Claims, 6 Drawing Sheets

(51) Int. Cl.
*C09J 7/20* (2018.01)
*C09J 7/00* (2018.01)

(52) U.S. Cl.
CPC ............ *C09J 7/20* (2018.01); *C09J 2203/358* (2020.08); *C09J 2301/20* (2020.08); *C09J 2301/204* (2020.08); *D06N 2209/108* (2013.01); *D06N 2211/103* (2013.01); *Y10T 428/28* (2015.01)

(58) Field of Classification Search
CPC ......... C09J 2301/204; D06N 2209/108; D06N 2211/103; Y10T 428/28
See application file for complete search history.

(56) References Cited

OTHER PUBLICATIONS

Israelachvili et al. Chapter 18 in Book "Intermolecular and Surface Forces", 3rd Edition 2011, pp. 469-499. https://doi.org/10.1016/C2011-0-05119-0. Details ISBN 978-0-12-391927-4.

Roberge, Jean-Philippe, Wilson Ruotolo, Vincent Duchaine, and Mark Cutkosky. "Improving industrial grippers with adhesion-controlled friction." IEEE Robotics and Automation Letters 3, No. 2 (2018): 1041-1048.

Esparza, Noe, "Design of bio-inspired directional tapered adhesives and hierarchies," PhD thesis, Stanford University, Dec. 2012.

Srinivasan A. Suresh, "Engineering Gecko-inspired adhesives," PhD Thesis, Stanford University, Mar. 2020, Appendix B.

\* cited by examiner wedge triangle apex angle, theta (θ)
wedge centerline angle of inclination, phi (φ)

GLOVE WITH DRY-ADHESIVE AND DRY-NON-ADHESIVE MICRO-WEDGES

CROSS-REFERENCE TO RELATED APPLICATIONS

This application is a continuation-in-part of U.S. patent application Ser. No. 15/966,264 filed Apr. 30, 2018, which is incorporated herein by reference.

U.S. patent application Ser. No. 15/966,264 filed Apr. 30, 2018 claims priority from U.S. Provisional Patent Application 62/492,248 filed Apr. 30, 2017, which is incorporated herein by reference.

FIELD OF THE INVENTION

This invention relates to selectively sticky and non-sticky materials for manipulating or handling objects.

BACKGROUND OF THE INVENTION

Gloves are frequently used in manufacturing operations to protect a user's hands while handling heavy objects. Often the gloves have high friction rubber on the finger pads and palm to reduce the grasp forces needed when gripping objects. However, even with high friction it can be tiring and cause repetitive stress injuries to grasp and lift heavy smooth objects like panes of glass or thick sheets of plastic or metal. The present invention advances the art by introducing gloves with gecko-inspired materials.

SUMMARY OF THE INVENTION

This invention equips a glove with gecko-inspired dry adhesives to greatly reduce the required grasp force on heavy, smooth items. The orientation of the gecko adhesives is designed to increase shear forces between the glove and the object when lifting and manipulating. The invention additionally equips the non-gripping surfaces of the glove (e.g. back and sides) with a non-adhesive microstructure that prevents the glove from accidentally adhering to surfaces during unintentional contact, even when touching otherwise sticky materials such as adhesive-coated automotive panels.

The present invention provides embodiments of a glove with on the outer surface of the glove:
(a) at least one area patch with distributed thereon dry-adhesive micro wedges, and/or
(b) at least one area patch with distributed thereon dry-non-adhesive micro wedges.

Each of the dry-adhesive micro-wedges is a first isosceles triangle is characterized by:
(i) a leading face and a trailing face both inclined in the same direction with respect to a vertical defined from the base of the dry-adhesive micro-wedge,
(ii) a leading direction asymmetric from a trailing direction,
(iii) an apex angle between 20 to 35 degrees,
(iv) an apex centerline angle of inclination with respect to the vertical between 25 and 45 degrees.

Each of the dry-non-adhesive micro-wedges is a second isosceles triangle is characterized by:
(j) a leading face and a trailing face both inclined yet in opposite direction from each other and with respect to a vertical defined from the base of the dry-non-adhesive micro-wedge,
(jj) a leading direction symmetric from a trailing direction,
(jjj) an apex angle between 75 and 110 degrees.
(jv) an apex centerline angle of inclination with respect to the vertical of about zero degrees.

The second isosceles triangles are wider than the first isosceles triangles.

In one example, the height of each of the dry-adhesive micro-wedges and each of the dry-non-adhesive micro-wedges defined from their respective bases is about 100 micrometers.

In still another example, in a case of at least two area patches with distributed thereon dry-adhesive micro wedges, the micro wedges of the one area patch points to a different direction than the micro wedges of the other area patch.

In still another example, the at least one area patch with distributed thereon dry-adhesive micro wedges are on a palm side of the glove to provide adhesion when grasping an object.

In still another example, the low-friction non-adhesive microstructure is useful on the back of the glove (back of the hand) so that it does not accidentally grab a surface when somebody brushes the back of the hand against it.

The invention has two parts, each of which provides advantages over the state of the art:

Part 1: With a conventional glove with high-friction rubber (e.g. with coefficient of friction of approximately 1.0) on the grasping surfaces, one needs a grasp force of approximately 5 N to lift a weight of 1 kg (see FIG. 7). In contrast, with the described invention the grasp force can be nearly zero. This is because the tangential lifting force depends on the area of contact and not on friction (see Israelachvili, chapter 18 in book "Intermolecular and Surface Forces", 3rd Edition 2011, pages 469-499) for a detailed discussion of area-controlled (adhesive) friction versus conventional load-controlled Coulomb friction). The adhesive gripping areas, at very low pressures (e.g. from a light grasp force), give 40 kPa 60 kPa of shear stress, which is available for lifting an object. It Is not meaningful to talk about coefficient of friction for such dry adhesives because the shear stress is present whenever there is contact, even if the normal pressure is zero.

Part 2: If the back or sides of the glove come into contact with a surface—including a sticky surface such as an automotive panel coated with incompletely dried paint, or caulking material, or pressure sensitive adhesives—the non-adhesive microstructure does not stick to such materials. It does not become dirty and it does not catch on such surfaces. Also, when in contact with smooth, dry materials it has no adhesive behavior and has a coefficient of friction of approximately 1, similar to a rough rubber.

DETAILED DESCRIPTION

Figure 1:
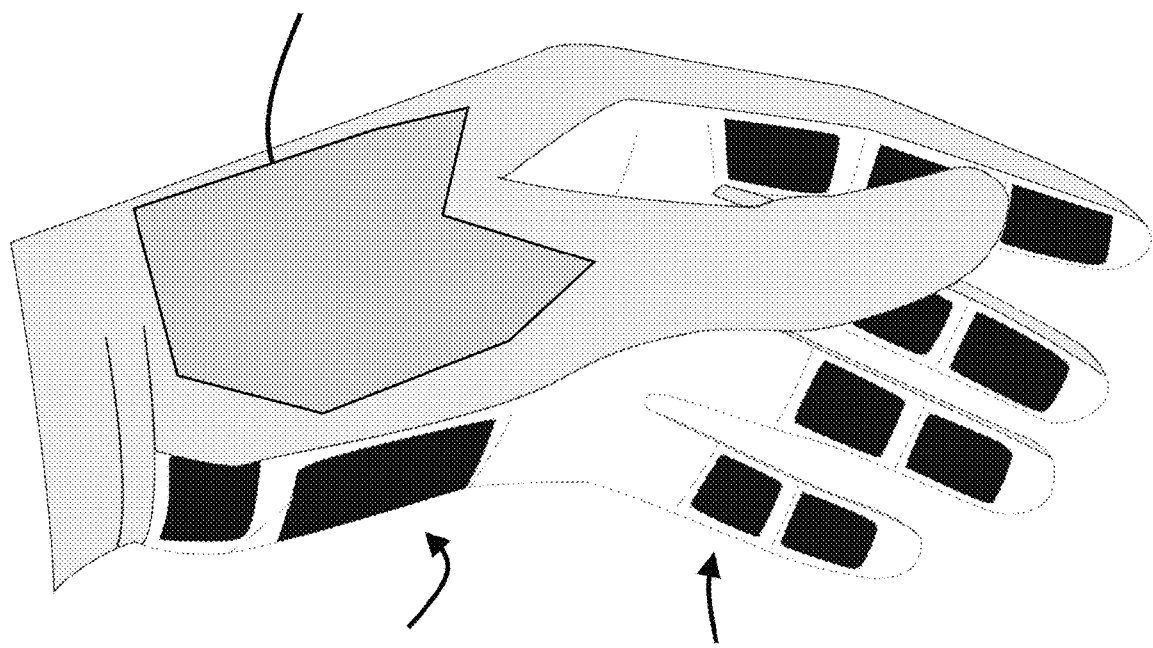
FIG. 1 shows a glove according to an exemplary embodiment of the invention with (i) dry non-adhesive micro-wedges and (ii) dry adhesive micro-wedges. On the back-side of the glove (side of the back of hand), in this example, there are dry non-adhesive micro-wedges. On the palm-side of the hand, in this example, there are dry adhesive micro-wedges. The micro-wedges could be in the form of one or more arrays or patches depending on the application.

FIG. 1 shows a glove distinguishing (i) dry non-adhesive micro-wedges and (ii) dry adhesive micro-wedges. On the back-side of the glove (side of the back of hand), in this example, there are dry non-adhesive micro-wedges. On the palm-side of the hand, in this example, there are dry adhesive micro-wedges. The micro-wedges could be in the form of one or more arrays or patches depending on the application. For example, the low-friction dry non-adhesive micro-wedges could be useful on the back of the hand so that it does not accidentally grab a surface when somebody brushes the back of the hand against it. The directional dry adhesive micro-wedges could be useful on the front of the hand so that they provide more adhesion when grasping objects.

Figure 2:
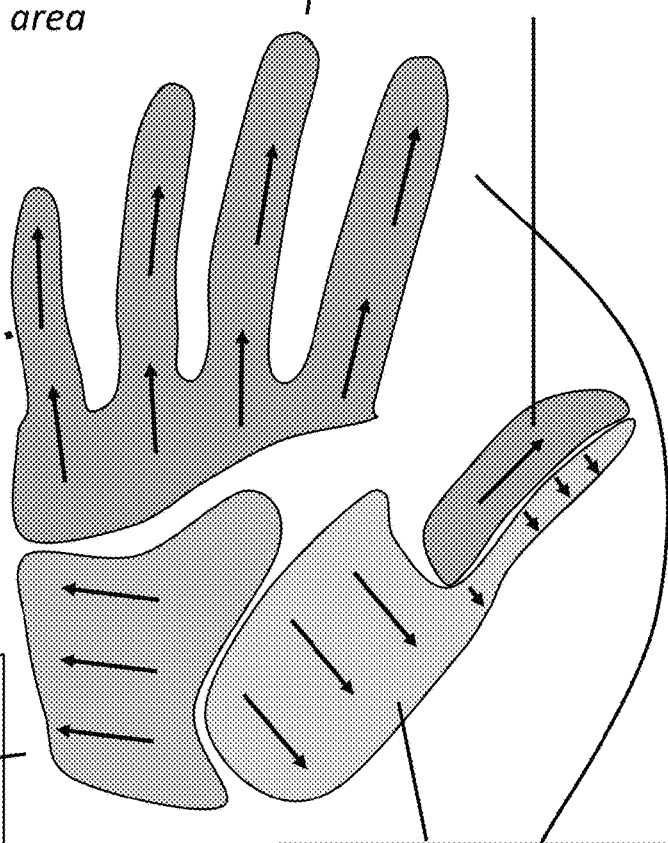
FIG. 2 shows a pattern for a glove according to an exemplary embodiment of the invention with (i) dry non-adhesive micro-wedges and (ii) dry adhesive micro-wedges. On the back-side and some sides of the glove (not visible in FIG. 2), in this example, there are dry non-adhesive micro-wedges. On the palm side of the hand, i.e. on the palm, some sides, and thumb, in this example, there are dry adhesive micro-wedges. The micro-wedges depending on the area have different directions of the micro-wedges, which could be in the form of one or more arrays or patches depending on the application.

FIG. 2 shows a pattern for a glove distinguishing (i) dry non-adhesive micro-wedges and (ii) dry adhesive micro-wedges. On the back-side and some sides of the glove (not visible in FIG. 2), in this example, there are dry non-adhesive micro-wedges. On the palm side of the hand, i.e. on the palm, some sides, and thumb, in this example, there are dry adhesive micro-wedges. The micro-wedges depending on the area have different directions of the micro-wedges, which could be in the form of one or more arrays or patches depending on the application.

Figure 3:
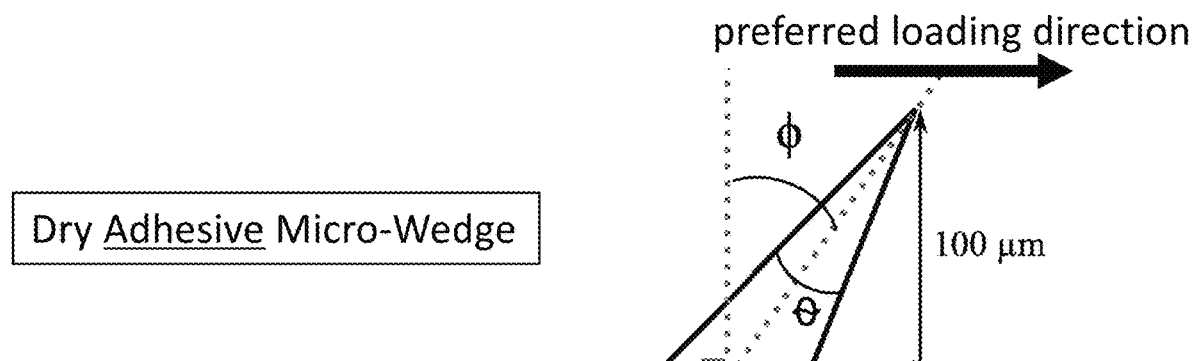
FIG. 3 shows according to an exemplary embodiment of the invention a schematic structural example of a single dry-adhesive micro-wedge which is referred to as an isosceles triangle. The schematic distinguishes a base, a vertical, a leading face, a trailing face both inclined in the same direction with respect to a vertical defined from the base, an apex angle theta ($\theta$), and an apex centerline angle phi of inclination ($\phi$).
Figure 5:
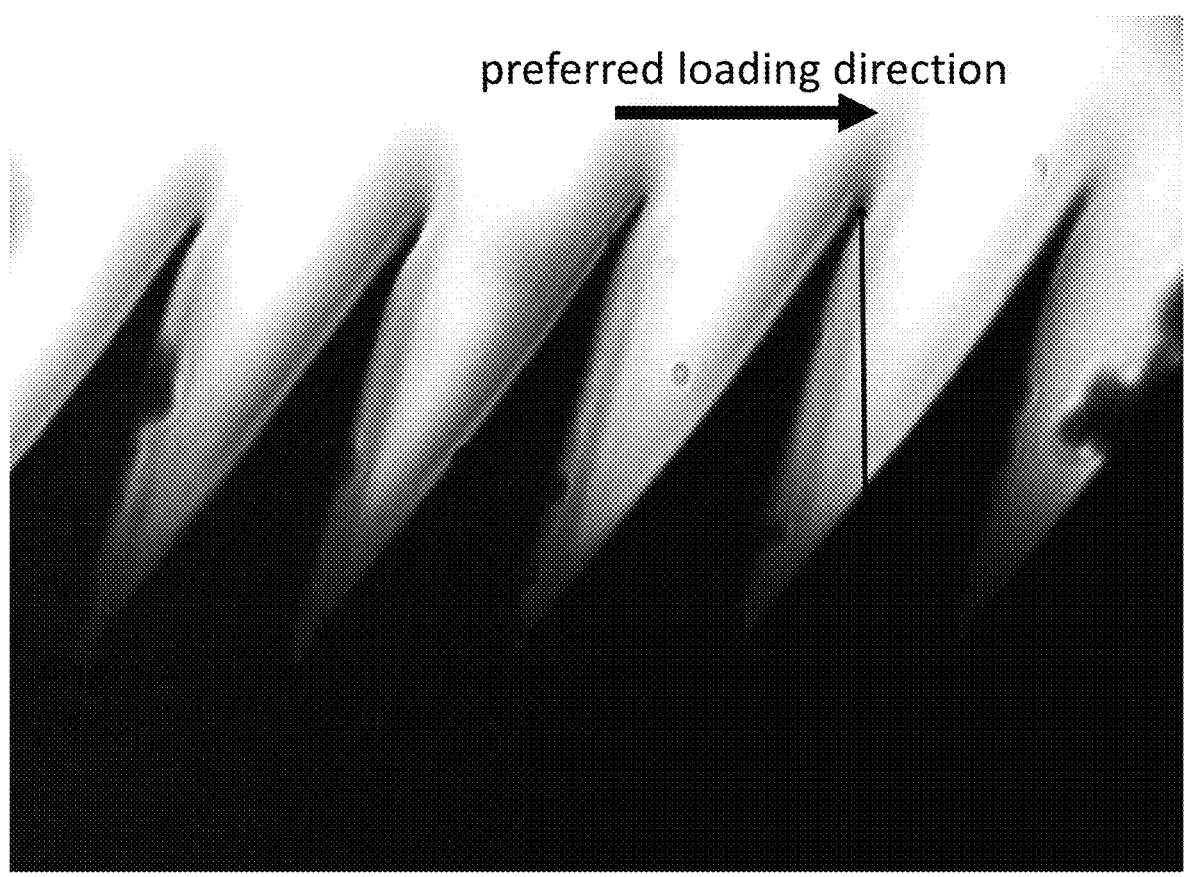
FIG. 5 shows a photograph image of an array with dry adhesive micro-wedges according to an exemplary embodiment of the invention.

FIG. 3 shows a schematic structural example of a single dry-adhesive micro-wedge which is referred to as an isosceles triangle. The schematic distinguishes a base, a vertical, a leading face, a trailing face both inclined in the same direction with respect to a vertical defined from the base, an apex angle theta ($\theta$), and an apex centerline angle phi of inclination ($\phi$). FIG. 5 shows a photograph image of an array with dry adhesive micro-wedges. These micro-wedges have a tip height of about 100 micrometers, an apex angle of about 25 degrees and generally between 20 and 35 degrees, and an angle of inclination defined against the vertical of about 35 degrees and generally between 25 and 45 degrees. These micro-wedges are typically spaced about 60 micrometers from tip to top.

Figure 4:
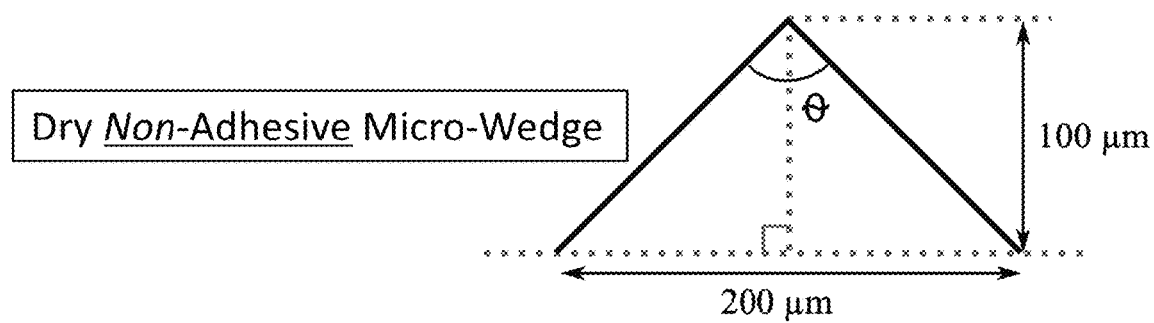
FIG. 4 shows according to an exemplary embodiment of the invention a schematic structural example of a single dry-non-adhesive micro-wedge which is also referred to as an isosceles triangle. The schematic distinguishes a base, a vertical, a leading face, a trailing face both inclined in the same direction with respect to a vertical defined from the base, an apex angle theta ($\theta$), and an apex centerline angle phi of inclination ($\phi$) which is zero for this micro-wedge or substantially zero.
Figure 6:
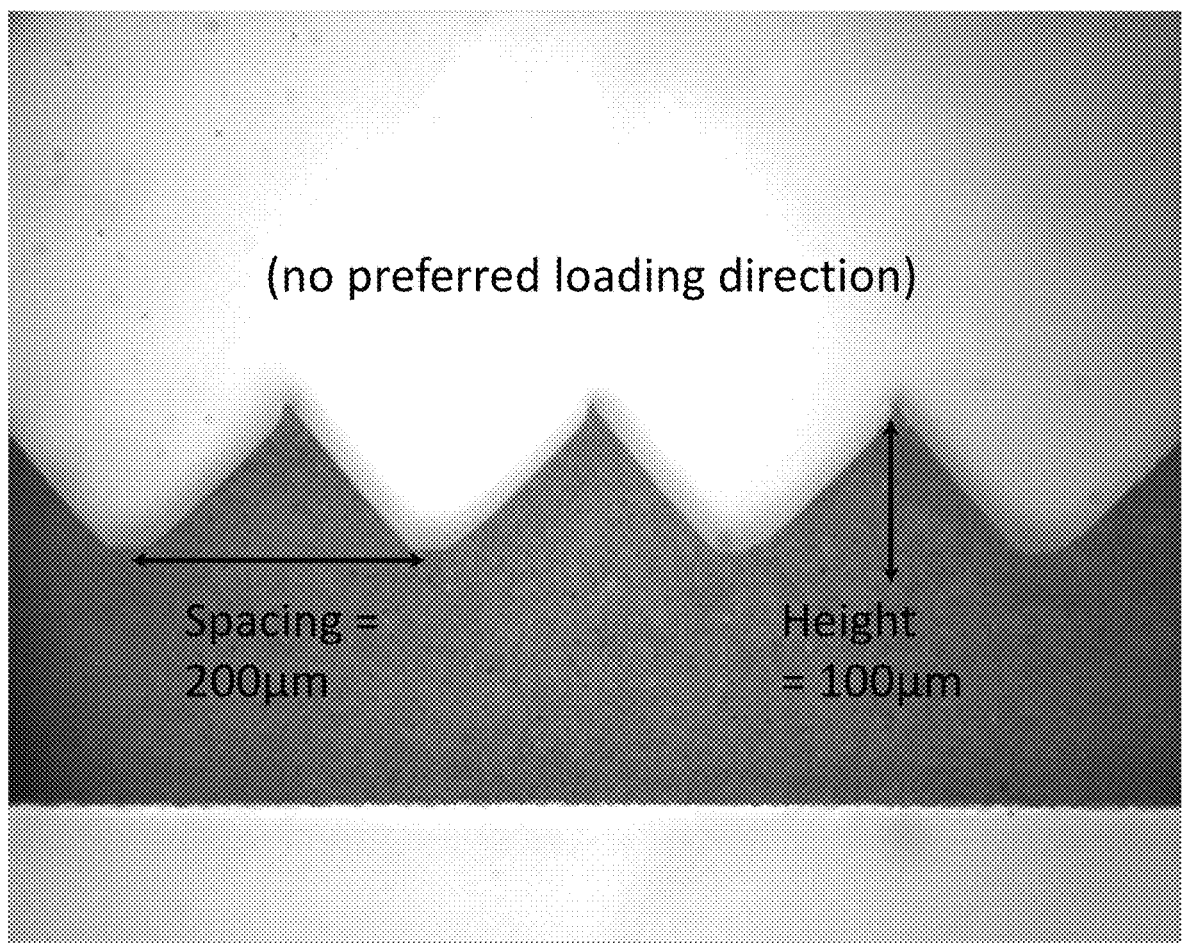
FIG. 6 shows a photograph image of an array with dry non-adhesive micro-wedges according to an exemplary embodiment of the invention.
Figure 7:
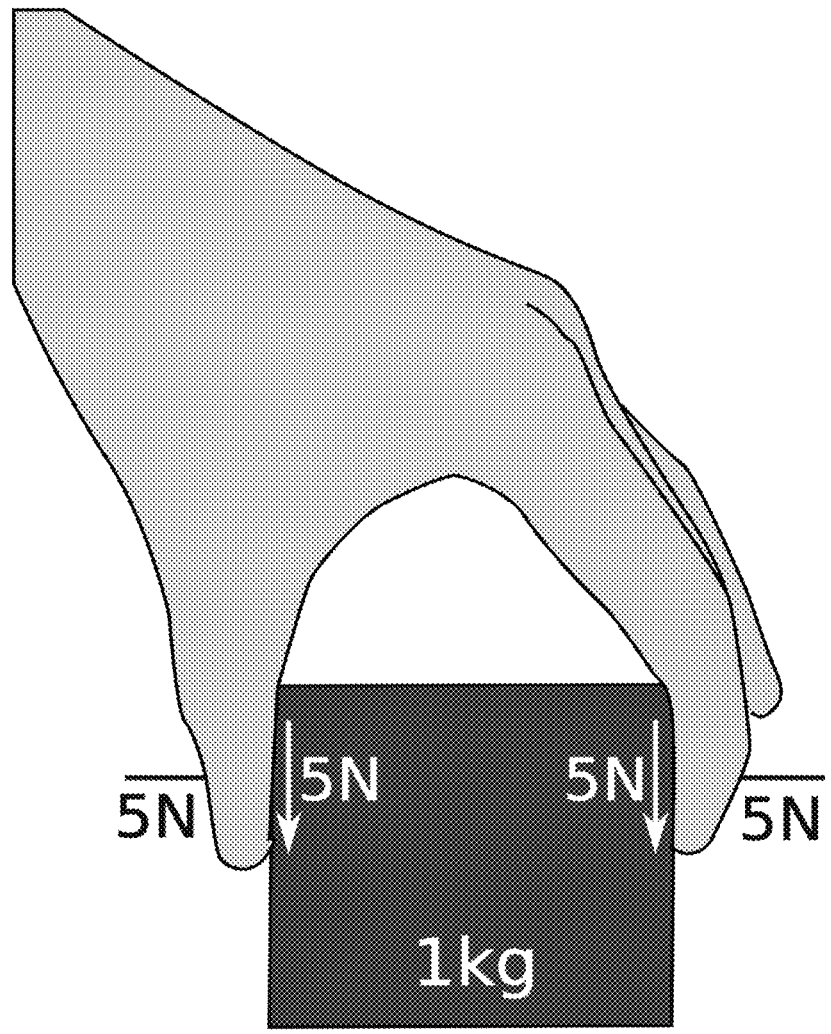
FIG. 7 shows according to the teaching of the invention with Coulomb friction and a coefficient of friction of approximately 1, an internal grasp force of 5 N is needed to lift 1 kg (mg=9.81 N).

FIG. 4 shows a schematic structural example of a single dry-non-adhesive micro-wedge which is also referred to as an isosceles triangle. The schematic distinguishes a base, a vertical, a leading face, a trailing face both inclined in the same direction with respect to a vertical defined from the base, an apex angle theta ($\theta$), and an apex centerline angle phi of inclination ($\phi$) defined against vertical, which is zero for this type of micro-wedge or substantially zero. FIG. 6 shows a photograph image of an array with dry non-adhesive micro-wedges. These micro-wedges have a tip height of 100 micrometers, an apex angle of about 90 degrees and generally between 75 and 110 degrees, and an angle of inclination of about 0 degrees or generally speaking substantially zero degrees. These micro-wedges are typically spaced about 140 micrometers from tip to top.

The method of making the micro-wedges or micro-structures is taught in Suresh et al. (Surface and Shape Deposition Manufacturing for the Fabrication of a Curved Surface Gripper. Journal of Mechanisms and Robotics, May 2015 V(7) 7 pages). The textbook mentioned infra by Israelachvili (2011) teaches adhesion and non-adhesion surfaces with friction. The dry adhesive micro-wedges are soft enough in bending to adhere to a surface when they are loaded in shear (tangential) direction. The dry non-adhesive micro-wedges are relatively fatter as shown in the figures and cannot bend, so they exhibit no measurable adhesion. Furthermore, they also have low friction relative to the dry adhesive micro-wedges.

When in contact with a smooth surface, the non-adhesive micro-wedges have no adhesion and give a coefficient of friction of approximately 1 (similar to rubber). In contrast, the dry adhesive areas, even at very low or even zero normal pressure, give approximately 40 kPa to 60 kPa of shear stress due to adhesion.

Automotive assembly and other manufacturing operation where people handle heavy smooth panels and especially panels that have some sticky materials applied in certain regions (e.g. caulking materials or pressure-sensitive adhesive strips).

What is claimed is:

1. A glove, comprising on the outer surface of the glove:
   (a) at least one area patch with distributed thereon dry-adhesive micro wedges, wherein each of the dry-adhesive micro-wedges is a first isosceles triangle having:
      (i) a leading face and a trailing face both inclined in the same direction with respect to a vertical defined from the base of the dry-adhesive micro-wedge,
      (ii) a leading direction asymmetric from a trailing direction,
      (iii) an apex angle between 20 to 35 degrees,
      (iv) an apex centerline angle of inclination with respect to the vertical between 25 and 45 degrees; and
   (b) at least one area patch with distributed thereon dry-non-adhesive micro wedges, wherein each of the dry-non-adhesive micro-wedges is a second isosceles triangle having:
      (j) a leading face and a trailing face both inclined yet in opposite direction from each other and with respect to a vertical defined from the base of the dry-non-adhesive micro-wedge,
      (jj) a leading direction symmetric from a trailing direction, (jjj) an apex angle between 75 and 110 degrees,
(jv) an apex centerline angle of inclination with respect to the vertical of about zero degrees; and
wherein the second isosceles triangles are wider than the first isosceles triangles.

2. The glove as set forth in claim 1, wherein the height of each of the dry-adhesive micro-wedges and each of the dry-non-adhesive micro-wedges defined from their respective bases is about 100 micrometers.

3. The glove as set forth in claim 1, wherein in a case of at least two area patches with distributed thereon dry-adhesive micro wedges, the micro wedges of the one area patch points to a different direction than the micro wedges of the other area patch.

4. The glove as set forth in claim 1, wherein the at least one area patch with distributed thereon dry-adhesive micro wedges are on a palm side of the glove to provide adhesion when grasping an object.

5. The glove as set forth in claim 1, wherein low-friction non-adhesive microstructure is useful on the back of the glove (back of the hand) so that it does not accidentally grab a surface when somebody brushes the back of the hand against it.

* * * * *